US010880727B2

(12) United States Patent
Ullah et al.

(10) Patent No.: US 10,880,727 B2
(45) Date of Patent: Dec. 29, 2020

(54) METHOD ENABLING MIGRATION OF A SUBSCRIPTION

(71) Applicant: Telefonaktiebolaget LM Ericsson (publ), Stockholm (SE)

(72) Inventors: Kazi Wali Ullah, Espoo (FI); Abu Shohel Ahmed, Espoo (FI); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 45 days.

(21) Appl. No.: 16/308,522

(22) PCT Filed: Jun. 23, 2016

(86) PCT No.: PCT/EP2016/064597
§ 371 (c)(1),
(2) Date: Dec. 10, 2018

(87) PCT Pub. No.: WO2017/220154
PCT Pub. Date: Dec. 28, 2017

(65) Prior Publication Data
US 2019/0174299 A1 Jun. 6, 2019

(51) Int. Cl.
*H04W 8/20* (2009.01)
*H04W 4/50* (2018.01)
(Continued)

(52) U.S. Cl.
CPC ......... *H04W 8/205* (2013.01); *H04L 63/0876* (2013.01); *H04L 63/102* (2013.01);
(Continued)

(58) Field of Classification Search
CPC . H04W 12/06; H04W 12/0023; H04W 8/205; H04W 8/183; H04W 4/50;
(Continued)

(56) References Cited

U.S. PATENT DOCUMENTS 10,321,303 B1 * 6/2019 Namiranian .......... H04W 40/04
2014/0073292 A1   3/2014 Kim et al.
(Continued)

FOREIGN PATENT DOCUMENTS

CN   103747104 A   4/2014
EP   2 905 980 A1   8/2015

OTHER PUBLICATIONS

International Search Report and Written Opinion of the International Searching Authority for International Application No. PCT/EP2016/064597 dated Feb. 24, 2017.
(Continued)

*Primary Examiner* — Natasha W Cosme
(74) *Attorney, Agent, or Firm* — Sage Patent Group

(57) ABSTRACT

A method enabling migration of a subscription from a source device to a destination device is disclosed. The method may be performed in a migration entity and comprises: receiving, from the source device, a confirmation of a first profile associated with the subscription having been deleted in the source device, securing a second profile associated with the subscription to be provisioned onto the eUICC of the destination device, wherein at least one piece of subscription information is the same for the first and second profiles, and providing an activation code for use in migration of the subscription to the destination device. A method in a source device, migration entity, source device, computer programs and computer program products are also provided.

20 Claims, 7 Drawing Sheets

(51) Int. Cl.
*H04W 12/04* (2009.01)
*H04L 29/06* (2006.01)
*H04W 8/24* (2009.01)
*H04W 12/06* (2009.01)

(52) U.S. Cl.
CPC .............. *H04W 4/50* (2018.02); *H04W 8/24* (2013.01); *H04W 12/0401* (2019.01); *H04W 12/04071* (2019.01); *H04W 12/06* (2013.01)

(58) Field of Classification Search
CPC ....... H04W 8/20; H04W 12/04; H04W 12/08; H04W 8/18; H04W 12/0609; H04W 88/02; H04W 4/60; H04W 4/70; H04W 12/00401; H04W 8/245; H04W 12/04031; H04W 8/265; H04W 12/004; H04W 12/0401; H04W 60/00; H04L 63/0853; H04L 63/0823; H04L 63/102; H04L 63/0869; H04L 67/303; H04L 2209/80; H04L 9/3247; H04L 9/3271; H04L 63/0876; H04L 63/20; H04L 67/30; H04L 67/34; H04L 67/42; H04L 9/3263; H04L 9/3268; H04L 63/0428; H04L 63/12; H04L 67/306; H04L 9/3234; H04L 63/067

See application file for complete search history.

(56) References Cited

U.S. PATENT DOCUMENTS

2014/0357229 A1 12/2014 Lee et al.
2016/0044496 A1 2/2016 Cormier et al.

OTHER PUBLICATIONS

GSMA Association, "RSP Architecture," Official Document SGP. 21, Version 1.0, Dec. 23, 2015, 52 pages.
GSMA Association, "RSP Technical Specification," Official Document SGP.22, Version 1.0, Jan. 13, 2016, 114 pages.

* cited by examiner

US 10,880,727 B2

METHOD ENABLING MIGRATION OF A SUBSCRIPTION

CROSS REFERENCE TO RELATED APPLICATIONS

This application is a 35 U.S.C. § 371 national stage application of PCT International Application No. PCT/EP2016/064597, filed on Jun. 23, 2016, the disclosure and content of which is incorporated by reference herein in its entirety.

TECHNICAL FIELD

The technology disclosed herein relates generally to the field of remote subscriber identity module provisioning, and in particular to a method enabling migration of a subscription from a source device to a destination device, a migration entity, a source device, computer programs and computer program products.

BACKGROUND

Groupe Special Mobile Association (GSMA) has released a technical specification defining remote subscriber identity module (SIM) provisioning for consumer devices. GSMA has also documentation relating to remote provisioning architecture for Embedded Universal Integrated Circuit Card (eUICC), which targets machine-to-machine (M2M) devices. The solutions of these specifications are slightly different but also have many parts in common; an operator uses an entity denoted Subscription Manager Data Preparation (SM-DP/SM-DP+) for creation of embedded SIM (eSIM) profiles that are later installed from SM-DP/SM-DP+ to the eUICC. In the consumer device solution, the profile is installed through a Local Profile Assistant (LPA) on the device to the Issuer Security Domain Profile (ISD-P) on the eUICC in the device. On the M2M side, the SM-DP installs the profile via a separate (external) entity, Subscription Manager Secure Routing (SM-SR), to the ISD-P on the device. GSMA is working on merging these two solutions into a common remote subscription management solution.

In common for both solutions is that the device owner obtains a subscription for the device from the operator by providing the operator with relevant information about the device to be provisioned, optionally including eUICC ID (EID) and International Mobile Station Equipment Identity (IMEI). The subscription may, for instance, be obtained from a point of sales or via an operator's web page.

SUMMARY

In the known SIM/Universal Subscriber Identity Module (USIM) based technology the identity of the subscriber is tied to a physical card. While this is inflexible in many ways, it still has an advantage over the eUICC based technology in that it allows the user to switch between devices just by removing the SIM/USIM card from one device and inserting it into another device. This is very convenient from a user perspective since the user does not have to (physically) go to the operator to receive this service. However, in the technical specifications defining remote SIM provisioning, there is no mentioning of this kind of transfer of subscription to a new device. One conceivable scenario in the future is that the mobile network operator (MNO) provides this subscription transfer as a service and that the user will have to go to an MNO service store for this change to be effectuated. This is clearly a less convenient solution compared to the user himself simply placing the SIM/USIM in the desired device. In particular, it is time-consuming as well as cumbersome for the user. A technical solution is needed that enables a user to conveniently migrate the subscription into a new device, in particular without requiring a visit to the MNO.

An objective of the present invention is to address and improve various aspects in view of subscription migration. A particular objective is to enable a user to migrate his/her subscription (and related profile) to a new device in a convenient way. This objective and others are achieved by the methods, devices, computer programs and computer program products according to the appended independent claims, and by the embodiments according to the dependent claims.

The objective is according to an aspect achieved by a method enabling migration of a subscription from a source device to a destination device. The method is performed in a migration entity and comprises receiving, from the source device, a confirmation of a first profile associated with the subscription having been deleted in the source device, securing a second profile associated with the subscription to be provisioned onto the embedded universal integrated circuit card of the destination device, wherein at least one piece of subscription information is the same for the first and second profiles, and providing an activation code for use in migration of the subscription to the destination device.

The method brings about several advantages. For instance, the method provides flexibility for users for migration of their subscriptions from one device to another. The user does not need to turn to a service provider for transfer of a subscription from one device to another.

The objective is according to an aspect achieved by a computer program for a migration entity for migration of a subscription. The computer program comprises computer program code, which, when executed on at least one processor on the entity causes the entity to perform the method as above.

The objective is according to an aspect achieved by a computer program product comprising a computer program as above and a computer readable means on which the computer program is stored.

The objective is according to an aspect achieved by a migration entity enabling migration of a subscription from a source device to a destination device. The migration entity is configured to: receive, from the source device, a confirmation of a first profile associated with the subscription having been deleted in the source device; secure a second profile associated with the subscription to be provisioned onto the eUICC of the destination device, wherein at least one piece of subscription information is the same for the first and second profiles; and provide an activation code for use in migration of the subscription to the destination device.

The objective is according to an aspect achieved by a method enabling migration of a subscription to a destination device. The method is performed in a source device and comprises: sending, to a migration entity, a confirmation of a first profile associated with the subscription having been deleted in the source device; sending, to the migration entity one of: an identification, EID, of an embedded universal integrated circuit card, eUICC, of the destination device and indication about the EID of the eUICC of the destination device being unknown.

The objective is according to an aspect achieved by a computer program for a source device for migration of a subscription. The computer program comprises computer program code, which, when executed on at least one processor on the source device causes the source device to perform the method as above.

The objective is according to an aspect achieved by a computer program product comprising a computer program as above and a computer readable means on which the computer program is stored.

The objective is according to an aspect achieved by a source device enabling migration of a subscription to a destination device. The source device is configured to: send, to a migration entity, a confirmation of a first profile associated with the subscription having been deleted in the source device; send, to the migration entity, one of: an identification, EID, of an embedded universal integrated circuit card, eUICC, of the destination device and indication about the EID of the eUICC of the destination device being unknown.

Further features and advantages of the embodiments of the present teachings will become clear upon reading the following description and the accompanying drawings.

ABBREVIATIONS

Figure 1:
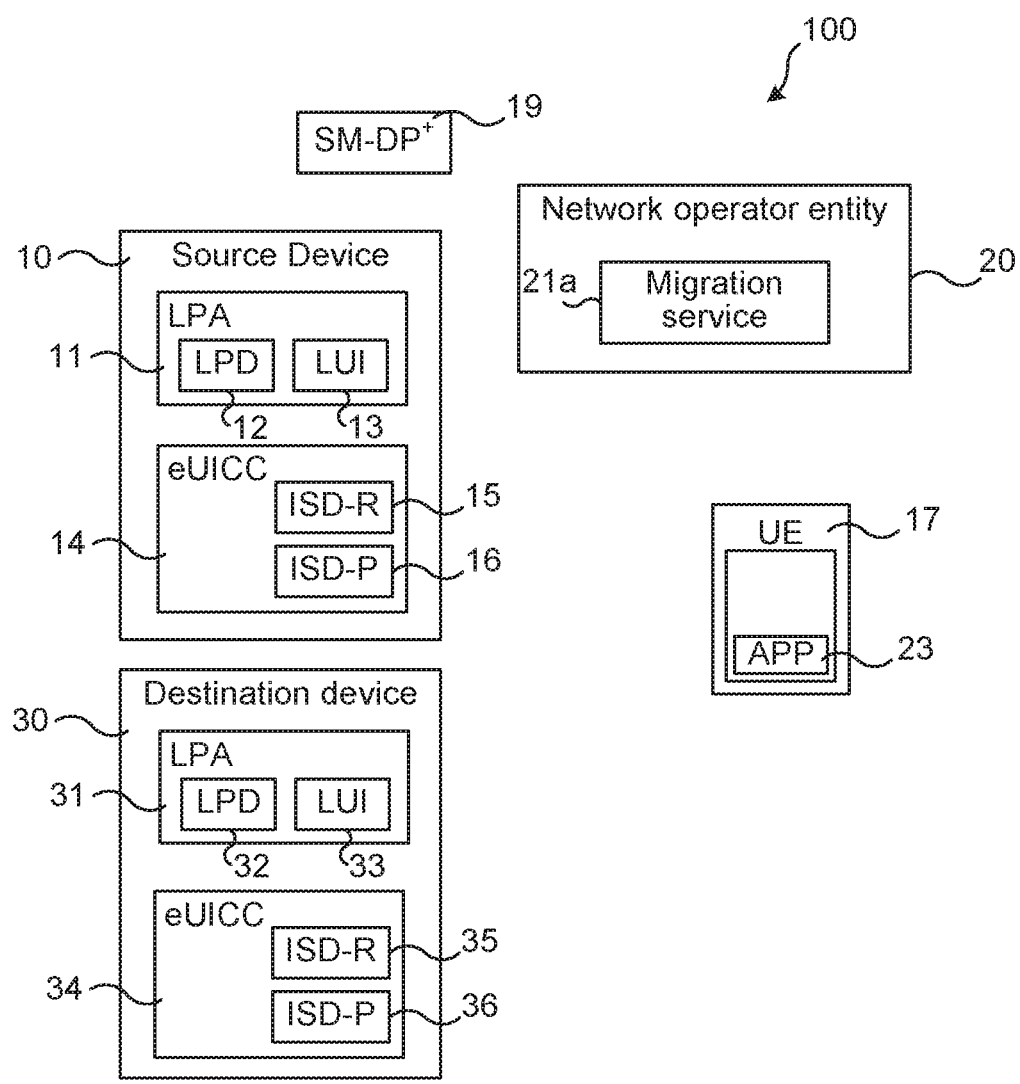
FIG. 1 illustrates schematically an environment in which embodiments according to the present teachings may be implemented.

GSMA Groupe Special Mobile Association
SIM subscriber identity module
eSIM embedded SIM
eUICC Embedded Universal Integrated Circuit Card
EID eUICC identity
M2M machine-to-machine
SM-DP/SM-DP+ Subscription Manager Data Preparation
LPA Local Profile Assistant
LPD Local Profile Download
LUI Local User Interface
ISD-P Issuer Security Domain Profile
ISD-R Issuer Security Domain—Root
Issuer Security Domain-Profiles (ISD-Ps)
SM-SR Subscription Manager Secure Routing
IMEI International Mobile Station Equipment Identity
MNO Mobile Network Operator
RSP Remote SIM Provisioning
UE User Equipment
HSS Home Subscriber Server
NFC Near Field Communication
SMS Short Message Service

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As an initial note on vocabulary it is mentioned that a profile in this context is a combination of a file structure, data and applications to be provisioned onto, or present on, an eUICC and which allows, when enabled, the access to a specific mobile network infrastructure. Generally, a subscription describes a commercial relationship between an end user and a service provider (the mobile network operator). At purchase of a subscription for an eUICC device the mobile network operator provides an activation code for enabling the user to download a profile to the eUICC of the device. The subscription comprises credentials which are loaded into the operator's network (e.g. HSS thereof) and into the eUICC enabling the device to obtain access to the mobile network. The profile may be seen as subscription parameters and credentials packaged for eUICC or installed on ISD-P in eUICC.

The way of obtaining a subscription, i.e. Remote SIM Provisioning (RSP), as suggested in Section 3.1 in GSMA RSP Technical Specification, Version 1.0, 13 Jan. 2016 is initially described in a summarized manner.

In the known profile download initiation process the user orders a subscription from the operator. The operator requests an SM-DP+ entity to generate a matching profile. Next, the operator provides the user with an activation code that the user can input to/provide to the device to be provisioned. The device can extract the relevant information, such as e.g. SM-DP+ reachability information, from the activation code. Having the information on how to reach the SM-DP+, the device contacts the SM-DP+ entity and after mutual authentication and various security functions the device downloads the profile by using the activation code.

The process of ordering the subscription/profile from the operator may entail giving the EID, IMEI and/or billing information. Giving the billing information typically entails identification and authentication of the user as well as possibly also providing other billing related information such as address and credit card number.

The GSMA documents suggest that these eUICC devices (companion device) may also be managed through a primary device (e.g. user equipment, UE). A companion device is a device that relies on the capabilities of a primary device for the purpose of remote SIM provisioning. The primary device may thus be used to provide some capabilities to the companion device for the purpose of Remote SIM Provisioning. The primary device may, for instance, provide global connectivity to the companion device (e.g. through WiFi tethering). The primary device may, for instance, act as the input device for entering e.g. the activation code of the companion device.

With the advent of 5G technology, wherein it is envisioned that a device that can connect to the Internet will indeed be connected, this Remote SIM Provisioning (RSP) solution can play an important role towards fulfilling that vision. In view of this, the present teachings provide flexible solutions using the RSP technology.

Briefly, in accordance with the present teachings, a user is enabled to request a migration of his/her subscription profile to a new device (also denoted destination device) with a specific EID (eUICC ID) using, for instance, a (software) migration application on the current device (also denoted source device) or using a primary device in case the current device is a companion device. In some embodiments, this involves the migration application, the MNO, the SM-DP+ and the LPA. In other embodiments, this migration request involves the migration application, SM-DP+ and the LPA. In the latter embodiments, the MNO may be involved in the process only e.g. if some of the subscription information (e.g. keys) are updated by the SM-DP+.

FIG. 1 illustrates schematically an environment in which embodiments according to the present teachings may be implemented.

The system 100 comprises a source device 10, also denoted eUICC device herein, which in turn comprises a Local Profile Assistant (LPA) 11. The LPA 11 comprises a Local Profile Download (LPD) 12 and a Local User Interface (LUI) 13. The source device 10 may, for instance, comprise a tablet, a wearable device, a smartphone, a handset, a computer, a car, sensors etc.

The source device 10 comprises an embedded universal integrated circuit card (eUICC) 14, provided by a eUICC manufacturer. An embedded UICC may be seen as a card that is fixed in the source device 10 and cannot be removed. The eUICC 14 may be seen as a reprogrammable SIM and is a secure hardware module typically soldered onto a circuit board. The eUICC manufacturer may, for instance, be a smart card manufacturer, a mobile network operator or device producer. On the eUICC hardware module one or more operator profiles may be stored, including e.g. International mobile subscriber identity (IMSI) number, ICCID, service provider name (SPN), authentication key and algorithms, applications and data.

The eUICC 14 comprises an Issuer Security Domain-Root (ISD-R) 15, which is responsible for creating new Issuer Security Domain-Profiles (ISD-Ps) and management thereof. The ISD-P 16 is a secure container (security domain) for hosting of a profile and used for profile download and installation. The source device 10 with the eUICC 14 may be used in order to connect to a mobile network.

The system 100 comprises a Subscription Manager Data Preparation which is an entity for creation of eSIM profiles that are later installed from the SM-DP entity 19 to the eUICC 14 of the source device 10. Although the Subscription Manager Data Preparation entity 19 is exemplified by SM-DP+ in the following, it is to be understood that the Subscription Manager Data Preparation entity may conform to, for instance, GSMA standards for either SM-DP or SM-DP+, with the addition of implementing also the methods according to the present teachings. In some embodiments, the SM-DP+ entity 19 may be a conventional prior art SM-DP+, in other embodiments the SM-DP+ entity is adapted and involved in providing a migration service. The operator of the mobile network has access to this SM-DP+ entity 19. The ISD-P 16 is the on-card representative of the SM-DP+ (an ISD-P is created by the ISD-R at the request of the SM-DP+ 19). The SM-DP+ binds Protected Profile Packages to the respective EID and securely downloads these Bound Profile Packages to the LPA of the respective eUICC.

The system 100 may also comprise a primary device 17, which is, as described earlier, a device that can be used for providing some capabilities to the source device 10 (being a companion device), in particular for the purpose of remote SIM provisioning. Further, the system 100 comprises a destination device 30 to which a subscription (and profile) that is currently used by the source device 10 is to be migrated. The destination device 30 may comprise a device such as the source device 10, i.e. the destination device 30 may comprise an LPA 31, in turn comprising an LPD 32 and a LUI 33. The destination device 30 further comprises a eUICC 34 comprising an ISD-R 35 and an ISD-P 36. The source device 10 and/or the primary device 17 may comprise a migration application 23 (only shown for the primary device 17) according to some embodiments (described later). Although the destination device 30 may also comprise a migration application 23, it is typically not aware of that a certain subscription is migrated to it from another device, it is simply obtains an activation code and downloads a profile. The subscription (i.e. profile) to be migrated may be migrated from any type of source device 10 to any type of destination device 30. However, the SM-DP entity 19 or MNO may have filtering rules putting limitations on what profiles may be migrated/installed on what (type of) device. For instance, the EID and/or IMEI may be verified e.g. in the profile ordering phase (or downloading and installation phase, or in migration phase of the present teachings) checking whether the destination device is compatible or capable of using the particular subscription.

In the description, focus is on the consumer devices solution, which uses an SM-DP+ entity (while M2M devices use an SM-DP entity). The SM-DP+ entity is the newer entity of the two and may be the base for the merged solution aimed at by GSMA, but the suggested solution may be applicable also to implementations comprising an SM-DP instead of an SM-DP+.

A method is, in various embodiments, provided for a user to securely migrate an existing subscription to a new device. A process is described next on how the MNO and the SM-DP+ together can provide an automated solution for profile migration into a new device.

The method may, for instance, be applied in a scenario where a user uses as a source device 10 a device with a 3GPP subscription for migrating a profile to a new device, i.e. to the destination device 30. Here, it is assumed that the source device 10 as well as the destination device 30 has internet connectivity by itself or by using a primary device 17. For the source device 10 the connectivity has to be other than 3GPP connectivity (as the source device 10 has a 3GPP subscription in this exemplary scenario) if the active profile is being migrated. That is, should the active profile be migrated then at some point in time the profile would be deleted and the connectivity could be lost thus hampering the migration process. The method may be used for temporary migrations, e.g. when temporarily migrating the subscription from a smart phone to a smart watch for the duration of a workout session, as well as for more permanent migrations.

According to an aspect, the MNO provides a migration service 21a for migrating a subscription that is provided as an eSIM. The MNO may provide the migration service 21a e.g. in the form of a web portal (in the following denoted migration portal) offering the migration service 21a, by means of which the user can perform eSIM migration. The user may connect to a migration portal with the source device 10 and use the migration service 21a provided through the migration portal. In other embodiments, the migration service 21a is accessed through a user interface of a migration application of the source device 10. The source device 10 first generates a secure session, e.g. a Transport Layer Security (TLS) session, with the migration entity 20 (e.g. a server) comprising the migration service 21a and generates session credentials to start further secure communication. For this secure session (TLS session is in the following used herein purely as an example of such secure session), only server side certificate is necessary as the important messages received from the source device 10 will be signed and verified using the eUICC certificate. The resulting session keys are used for protecting the communication between the source device 10 and the migration service 21a. The connection to the migration portal may be seen as an implicit request to perform a migration. In other embodiments, an explicit message from the source device 10 to the migration portal (after TLS establishment) is sent after which the MNO asks the source device 10 to identify profile to be migrated. Once this is done, the MNO asks the source device eUICC 14 to identify the profile that will be migrated. The profile in the eUICC 14 of the source device 10 may be identified with a unique Integrated Circuit Card ID (ICCID) number, and the eUICC might also provide the EID and use the associated certificate for authentication and authorization of the migration. In still other embodiments, also the IMSI may be used for identifying the subscription within the source device 10. This is particularly valuable if the request goes via the MNO since the IMSI may be an easier way for the MNO to identify the subscription. After, optionally, verifying the eligibility of migration for the profile, the MNO migration service 21a requests the eUICC 14 of the source device 10 to delete the profile and waits for a confirmation from the source device 10 that the profile has been deleted. In other embodiments, before requesting the source device 10 to delete the profile, information about the destination device 30 (e.g. its EID) is requested. This enables the network side to verify that the destination device is eligible for the profile in question.

According to some embodiments, a network entity 20 is provided which comprises the above mentioned migration service 21a. The system 100 comprises, in these embodiments, such a network entity 20. The network entity 20 may, for instance, be a server, a virtual server or a virtual machine. The migration service 21a may, as mentioned above, be accessed by the user by means of a migration portal. The migration portal may, for instance, comprise a website or webpage published on a server and through which the user can request a subscription to be migrated. That is, the user may access (request) the migration service 21a through the user interface of the migration portal, through which the user can select and request a subscription to be migrated. When the user requests the migration service 21a, a migration process is initiated. As another example, the migration service 21a may be accessed (requested) through the application 23 (also known as "mobile app", "app" and "application software") of a user device. Downloading and installation are protected by profile management credentials shared between the SM-DP+ entity 19 and the eUICC 14, 34. The LPD 12, 32 then downloads the profile to the ISD-P 16, 36 with the help of ISD-R 15, 35.

In embodiments according to the present teachings, the delete response from the ISD-R 15 in the eUICC 14 of the source device 10 fulfills the requirement that it is signed by the eUICC certificate so that it can be verified later on by the MNO. Additionally, the delete message should also comprise the ICCID of the profile that has been deleted. This is important as the MNO has no other way of knowing whether the actual profile with the ICCID number that was sent previously for deletion has been deleted or not.

After receiving this deletion confirmation and verifying its authenticity, the MNO is ready to order an update of the profile and optionally modifying parts of the subscription information. The update order is sent to the SM-DP+ entity 19 and in this update order the migration service 21a identifies the profile to be updated, using e.g. EID of the source device 10, and/or ICCID-number of the profile, and/or IMSI of the subscription. The update order also comprises parameters to modify (if any). The EID of the destination device 30 should also be provided in order for the SM-DP+ to make a bounded profile. The EID of the destination device 30, i.e. the EID to bind the new/updated profile to, may be provided at different stages of the migration process (described later). The SM-DP+ entity 19 can now prepare the updated profile and make it available for download to the destination device 30. After getting the confirmation from the SM-DP+ entity 19, the migration service 21a generates an activation code that can be used by the destination device 30 to download the profile (or used by a primary device on behalf of the destination device 30). The inclusion of a confirmation code is optional in the activation code (according to current specifications), and may therefore, in some embodiments, be omitted for the profile migration scenario. Omission of the confirmation code provides the advantage of not slowing down the migration process. It is noted that, although the confirmation code may also be generated by the SM-DP+ entity 19/MNO, it is the distribution of this confirmation code that may slow down the whole process.

As mentioned above, the EID may be provided at different stages of the migration process. Above, the EID is described when being provided prior to the migration service 21a generating the activation code. In other embodiments, the EID is not provided when the migration service 21a requests it, but is instead provided after the migration service 21a has generated the activation code. If, for instance, the user does not have the EID of the destination device available at the moment, and the EID is therefore not provided (or for some other reason), the migration service 21a may generate/update the profile without including the EID of the destination device, i.e. there is (yet) no EID to bind the new/updated profile to. An empty string may instead be sent or a predefined code stating the EID to be unknown. The activation code is generated anyway and sent to the source device 10, which is then communicated to the destination device 30. The destination device 30 uses the activation code for downloading the profile and now (at this stage) provides the EID (its EID) to the SM-DP+ entity. The SM-DP+ entity can then create the bound profile package based on the EID, i.e. a delayed creation of bound profile, after which the profile can be downloaded. The EID is thus, in such embodiments, provided when using the activation code for downloading the profile.

Figure 2:
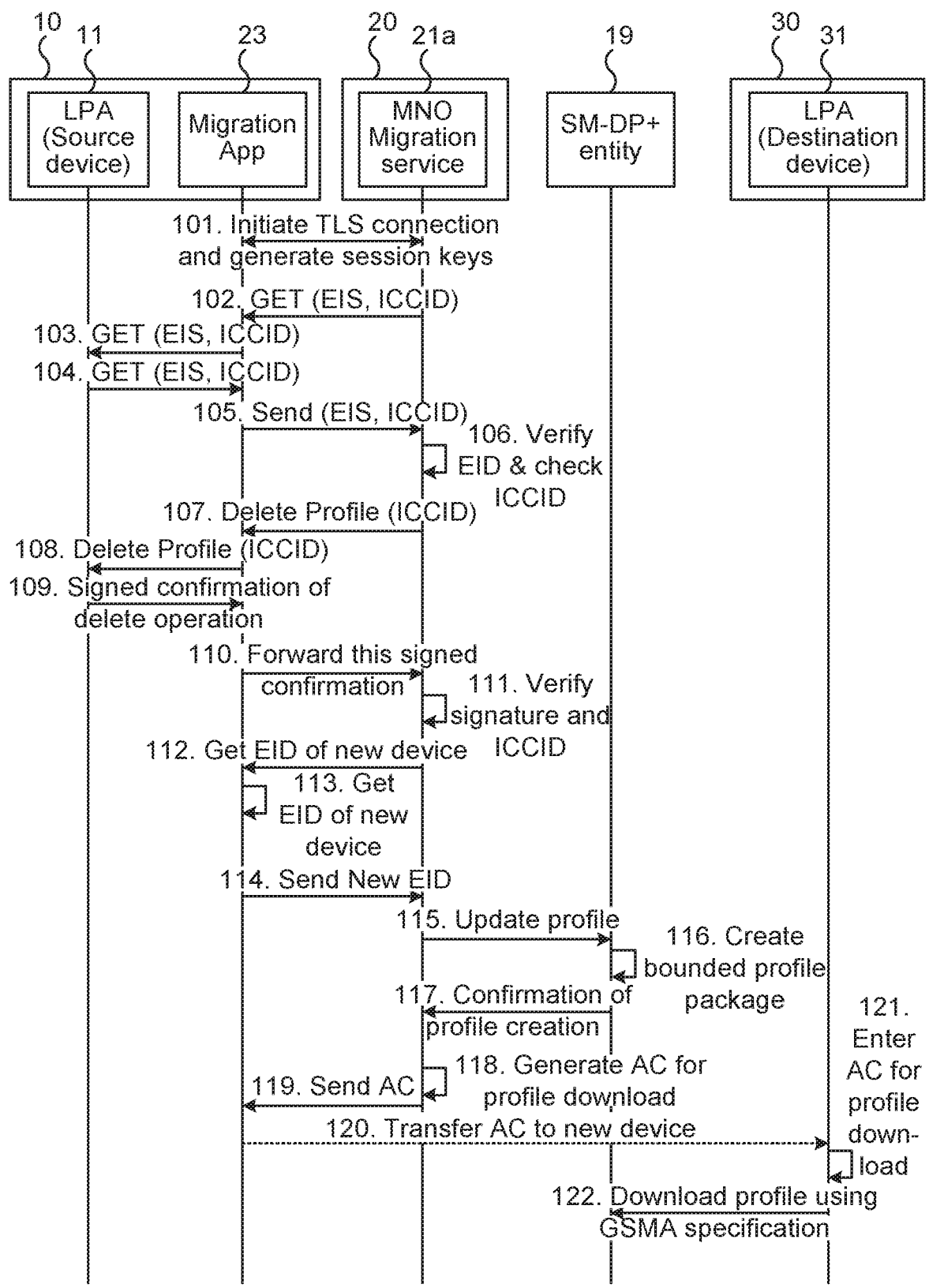
FIG. 2 is a signaling diagram illustrating various embodiments of the present teachings, with a mobile network operator involvement.

FIG. 2 is a signaling diagram illustrating various embodiments of the present teachings, with a mobile network operator involvement. In particular, the above briefly described process is illustrated and described more in detail with reference to FIG. 2. These embodiments involve the source device 10 comprising or having access to the migration application 23, the migration service 21a provided by the MNO, the SM-DP+ 19 and the destination device 30 (LPA 31 thereof). A step by step description is provided in the following:

At arrow 101, the user launches the migration application 23 in the source device 10 from where he/she can migrate the current subscription. As noted earlier, it may also be possible to launch the migration operation using a primary device 17 if the source device 10 is e.g. a companion device and has no user interface. The migration application 23 first initiates a TLS session with the associated MNO's migration portal and in particular the migration service 21a. The address of this migration service 21a may be obtained in many ways. As one example, the migration application 23 may itself have the address, for instance in case the migration application 23 is developed by the MNO. As another example, this address may be found from the profile itself by using SIM application toolkit operation if it is supported by the MNO or the address may be reachable from the operator's web pages. TLS session keys are used for further secure communication between the migration application 23 and the MNO device 20.

At arrow 102, the MNO migration service 21a asks for the eUICC Information Set (EIS) and the ICCID of the profile that is to be migrated from the migration application 23. The EIS comprises a certificate of the eUICC 34 of the source device 10. The certificate also includes the EID of the eUICC. Using this certificate the migration service 21a verifies the EID of the eUICC and matches the received ICCID of the profile to be migrated. This verification may use an internal database of the MNO (if it stores all the ICCID) or the migration service 21a may simply store the ICCID for future matching.

At arrow 103, the migration application 23 queries (e.g. using the LUI 13) the LPA 11 of the source device 10 for this EIS and ICCID.

At arrow 104, the LPA 11 provides this information (e.g. via the LUI 13) to the migration application 23.

At arrow 105, the migration application 23 forwards the obtained EIS and ICCID to the migration service 21a of the MNO.

At arrow 106, the migration service 21a of the MNO queries its internal database to find related information for this EID and ICCID, using the information sent by the eUICC 14. The migration service 21a of the MNO may at this point verify whether it will allow this profile to be migrated into a new device (the destination device 30) or not depending on its policy for this subscription. It may not always be allowed to migrate a certain subscription, e.g. in case of subsidized subscriptions, which are usually tied to a subsidized handset and are not allowed to be migrated.

At arrow 107, the migration service 21a of the MNO asks the migration application 23 to delete the eUICC profile having this particular ICCID.

At arrow 108, the migration application 23 starts the Delete profile functionality e.g. using the LUI 13 of the LPA 11. The delete operation is completed essentially as specified in the earlier mentioned GSMA specification. An exception is, as has been mentioned, that the delete confirmation message according to the present teachings has to comprise the ICCID of the deleted profile and has to be signed by the eUICC certificate.

At arrow 109, the signed confirmation of this delete operation is sent back to the migration application 23 from the LPA 11 (e.g. via the LUI 13).

At arrow 110, the migration application 23 forwards the signed confirmation to the migration service 21a of the MNO.

At arrow in, the migration service 21a of the MNO verifies the signature of the signed confirmation using the certificate sent previously (at arrow 105). The migration service 21a also verifies the ICCID presented in this message with the ICCID that was requested to be migrated at arrow 105. This signature verification is valid since the certificate sent at arrow 105 has its root of trust from the Certificate Issuer (CI) which the MNO in turn trusts.

At arrow 112, after confirming that the current profile for this subscription is deleted in the source device 10, the migration service 21a of the MNO asks for the EID of the new device's eUICC (i.e. eUICC 34 of the destination device 30) from the migration application 23. As noted earlier, information about the destination device 30 (e.g. its EID) may be requested before this deletion. For instance, the migration service 21a may request the information about the destination device 30 before or in relation to step described at arrow 102, i.e. requesting information about the source device and the destination device at the same time.

At arrow 113, the migration application 23 asks the user to input the EID of the destination device's 30 eUICC 34 to which the subscription will be migrated. The user may input it manually or having the source device 10 querying the information from the destination device 30 or the destination device 30 may produce the EID in some form of machine readable format (e.g. a Quick Response (QR) code) and the source device 10 may read it by itself (e.g. using a QR-scanner).

At arrow 114, the migration application 23 forwards this EID to the migration service 21a of the MNO.

At arrow 115, the migration service 21a of the MNO starts preparing profile data for the destination device 30 and sends a command to the SM-DP+ entity 19 to update and create a bound profile package for this destination eUICC 34. The migration service 21a of the MNO makes sure that selected subscription information remains the same for the new profile. For instance, the MSISDN and IMSI may remain the same for the updated profile, while the subscription key may be changed. The migration service 21a of the MNO may need to update some information in its internal database while ordering an update of the profile for this new EID.

At arrow 116, the SM-DP+ entity 19 generates the bound profile package for the new eUICC, i.e. the eUICC 34 of the destination device 30.

At arrow 117, the SM-DP+ entity 19 sends the confirmation to the migration service 21a of the MNO about having created the requested bound profile package.

At arrow 118, the migration service 21a of the MNO generates an Activation Code, as per the earlier mentioned GSMA specification. The activation code is required in the profile download phase.

At arrow 119, the activation code is sent to the migration application 23. The activation code may be sent in plain text for subsequent manual input or it may be sent in some machine readable format.

At arrow 120, the activation code is transferred from the migration application 23 to the destination device 30. It may, in correspondence with the previous step at arrow 110, be a manual input performed by the user in the destination device 30 or it may be performed as a machine reading e.g. QR code scanning. In still another embodiment, the activation code is transferred from the migration application 23 to the destination device 30 using a wireless and/or wired connectivity, such as e.g. NFC, WiFi or Bluetooth between the migration application 23 and the destination device 30.

At arrow 121, the user initiates the profile download process in the destination device 30 (or on behalf of the destination device) and is prompted for the activation code. Now the activation code can be read from the migration application 23 in the source device 10 and entered in (or on behalf of) the destination device 30 for performing a profile download process.

At arrow 122, the destination device's 30 eUICC 34 continues with the profile download according to procedure as defined in the earlier mentioned GSMA specification.

In some embodiments, when the migration service 21a asks for the EID (arrow 112) of the eUICC 34 of the destination device 30, no EID is provided in response. An empty string may instead be sent or a predefined code stating the EID to be unknown.

In embodiments, wherein the EID has not initially been provided, the action of creating a bound profile package described at arrow 116 is not (yet) possible. In these embodiments, the migration service 21a may instead contact the SM-DP+ entity 19 for generating/updating the profile without providing the EID of the eUICC 34 of the destination device. The SM-DP+ entity 19 cannot bind the profile package to the EID, but may otherwise prepare the new profile. For instance, the SM-DP+ entity 19 may store e.g. received updates relating to the profile (to the extent that is possible without having the EID). In particular, the SM-DP+ allocates the unbounded profile and sends a confirmation to the MNO about this allocation. Based on this, the activation code is generated and delivered to the user. The SM-DP+ thus allocates a profile and sends a confirmation to the migration service 21a about this allocation.

In these embodiments, when, at arrow 118 above, the activation code is generated, the destination device 30 uses it for downloading (at arrow 122) the profile and now provides its EID to the SM-DP+ entity 19. The SM-DP+ entity 19 is then able to create the bound profile package based on the EID and the profile downloading can be effectuated. These embodiments may thus be seen as implementing a delayed creation on bound profile.

The steps that have been described may, as has already been exemplified, be performed in another order than illustrated and described with reference to FIG. 2. For instance, the steps described with reference to arrows 112, 113 and 114 may be performed after the step at arrow 101 or after the step at arrow 104 as these three former steps (at arrows 112, 113 and 114) are informational steps and the only requirement is that the use of this information (updating the profile to a new device) should be completed after the profile has been deleted from the old device. After successful downloading of the profile in the destination device's 30 eUICC 34 and after activating this profile, the user may use the same subscription for the destination device 30 as was used for the source device 10.

There are several implementation options possible for (in step at arrow 115) ordering an update of a profile from the SM-DP+ 19, i.e. the migration service 21a may be implemented in different ways. The migration service 21a may reuse the old IMSI and the old keys associated with it or it may use the old IMSI and generate new keys based on MNO's internal policy for this profile migration process. The profile generation process between the migration service 21a of the MNO and the SM-DP+ 19 is non-standardized and there may be several possible ways to generate/update a profile with same subscription information. One particular example of this is that the migration service 21a of the MNO provides the EID of the destination device 30, the ICCID of the old profile, the IMSI and Keys (old IMSI and old or new keys) and the ProfileDescriptionID (same one used for old profile) to the SM-DP+ entity 19. The ProfileDescriptionID is a non-standardized ID used by SM-DP+ 19 to identify MNO specific different profile types which in turn contains the Network Access Application like USIM, file structure, data and applications, etc.

Now the SM-DP+ entity 19 can verify that the ICCID, IMSI and the ProfileDescriptionID all are same while the EID is new. The SM-DP+ entity 19 has access to information on profiles that it has generated, and if a profile having e.g. same IMSI but new EID is requested, then the SM-DP+ entity 19 may determine that this is a profile update request. This can thereby trigger a re-use of subscription information in the SM-DP+ entity 19, which generates a bound profile package with same subscription information as for the old EID to this new EID. An alternative to this, is that the migration service 21a of the MNO and SM-DP+ entity 19 have a prior agreement and a defined method to order a profile re-use for a new EID with same subscription information. It is noted that the old profile in the SM-DP+ entity 19 should be deleted or overwritten/replaced with the new profile so that the old profile cannot be downloaded with the old activation code after the profile migration has been effectuated.

It is noted that the EID is important for the profile generation/downloading phase. However, the EID is not necessarily important during the radio access phase. For regular SIM devices, the IMEI is not (typically) bound to the subscription so the mobile network operator will not check whether one particular IMSI is used in a device with a particular IMEI. However, it is a function that operator can use independently for ensuring that stolen equipment does not get network access. If IMEI is not bounded to IMSI, then it also makes it easier to switch the SIM from one device to another. For the eUICC case, the profile is bound to the EID. However, if complying with current methods of hardware checking, the operator would not check the EID during access, but instead only (optionally) the IMEI.

Figure 3:
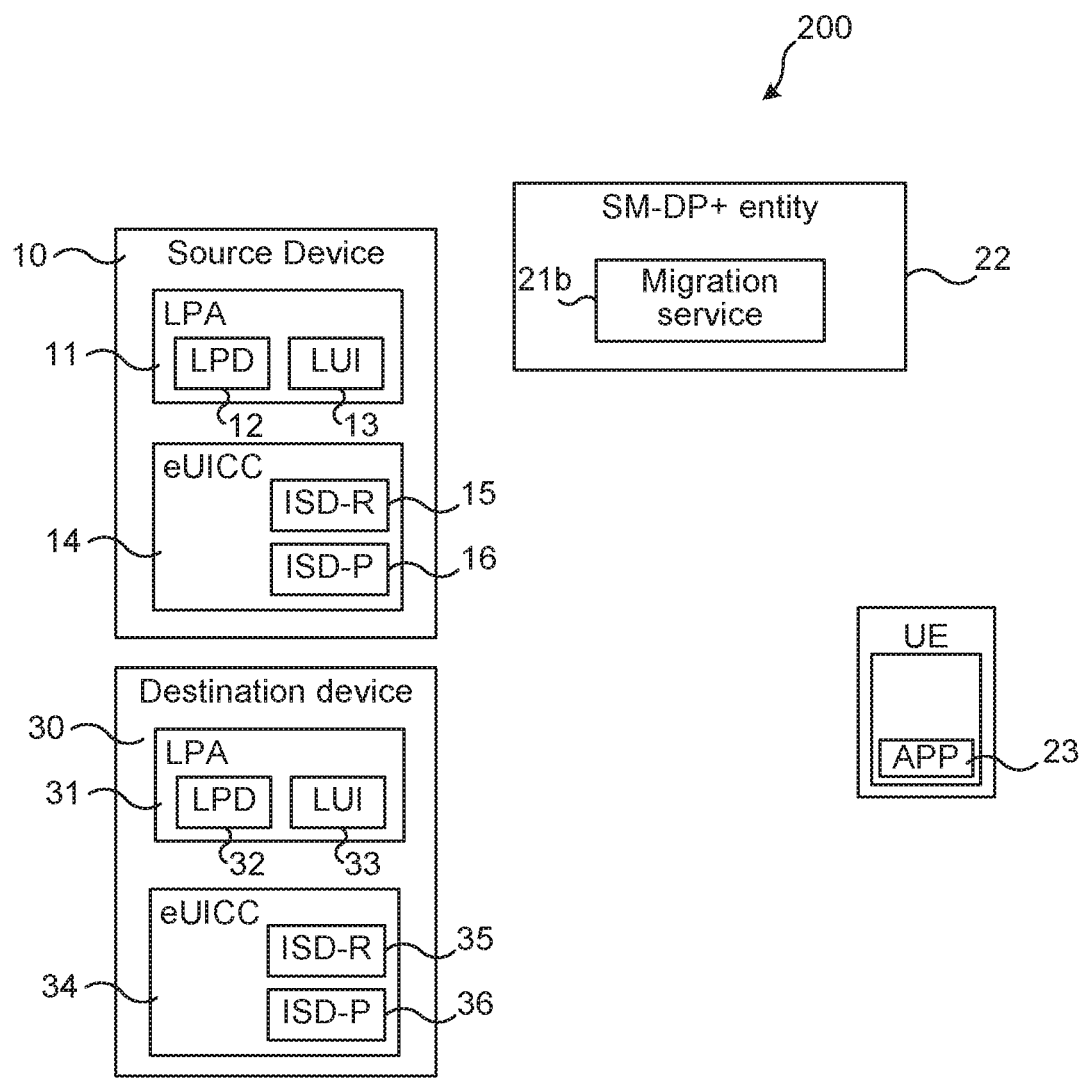
FIG. 3 illustrates schematically an alternative environment in which embodiments according to the present teachings may be implemented.

FIG. 3 illustrates schematically an alternative environment in which embodiments according to the present teachings may be implemented.

The system 200 illustrated in FIG. 3 differs from the system 100 illustrated in FIG. 1 in that the method is implemented in an SM-DP+ entity 22 instead of in an entity or node typically operated by the MNO (although it is noted that the SM-DP+ entity 22 may also be provided/operated by the MNO). The description provided in relation to FIG. 1 is thus applicable in other regards also for FIG. 3 and is not repeated here. The SM-DP+ entity 22 may be modified compared to the SM-DP+ entity 19 of the system 100 illustrated in FIG. 1, which may be a prior art SM-DP+ entity. The SM-DP+ entity 22 of the system 200 is provided with a migration service 21b which a user can contact for migrating a subscription from one device to another. In embodiments implemented in such system 200, the MNO does need to be involved, and is alleviated from having to support such service. However, if any changes are to be made to the profile relating to the subscription, then the MNO will typically have to be contacted and hence be involved.

Figure 4:
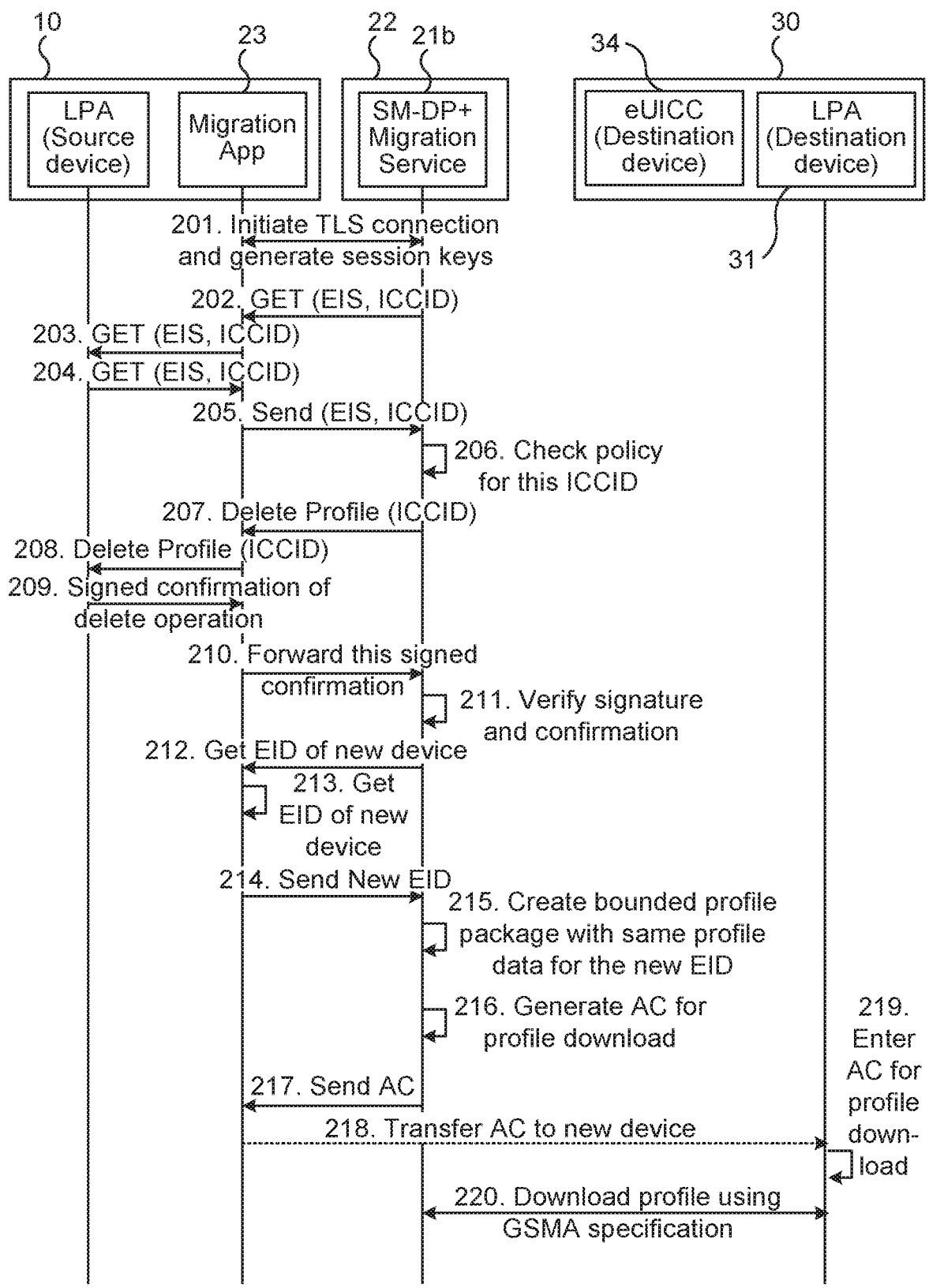
FIG. 4 is a signaling diagram illustrating various embodiments of the present teachings, without mobile network operator involvement.

FIG. 4 illustrates in a signaling scheme various embodiments of the present teachings, in particular involving the migration application 23 of the source device 10, the SM-DP+ entity 22, the source device 10 and the destination device 30 (and LPAs 11, 31 thereof). As mentioned, MNO is not necessarily involved. A method, in various embodiments, is provided for a user to securely migrate an existing subscription to a new device. In these embodiments, a process is described on how the SM-DP+ entity 22 can play a central role for this migration with very little or no involvement from the MNO.

In this solution the user uses a device with a 3GPP subscription as the source device 10 for migrating a profile to a new (destination) device 30. It is assumed that both the source device 10 and destination device 30 has internet connectivity by itself or by using a primary device. For the source device 10 the connectivity has to be other than 3GPP if the active profile is being migrated, since if the active profile is being migrated then at some point of time the profile will be deleted and the connectivity could be lost thus hampering the migration process.

Another assumption here is that the SM-DP+ entity 22 stores all the profile related information that it has received from the MNO in order to generate a profile. Since the MNO is not involved in the profile update phase, the SM-DP+ entity 22 has to provide all the profile related information by itself.

Similar to the embodiments described with reference to FIG. 1, the SM-DP+ entity 22 may provide an eSIM migration service 21b through a management portal, to which the user connects to with the source device 10. The source device 10 first finds the address of the serving SM-DP+ and establishes a TLS session with the migration service 21b and generates session credentials to start further secure communication. For this TLS session, only server side certificate (SM-DP+ certificate for TLS e.g. CERT.DP.TLS, which is signed by a globally trusted CA) is necessary as the important messages received from the source device will be signed and verified using the eUICC certificate. The resulting session keys are used for protecting the communication between the primary device and the migration service. An alternative to the above mentioned process is to do a mutual authentication between the SM-DP+ 22 and the eUICC 34 using the certificates of both that are signed by a common CI. After mutual authentication, a secure channel can be established between the source device 10 and the SM-DP+ migration service 21b.

Once this is done, the SM-DP+ entity 22 requests the source device 10 (eUICC 14 thereof) to identify the profile that will be migrated. The profile in the eUICC 14 is identified with a unique Integrated Circuit Card ID (ICCID) number and the eUICC 14 also provides the EID in the associated certificate for authentication and authorization of the migration. After (optionally) verifying the eligibility of migration for the profile, the SM-DP+ migration service 21b requests the eUICC 14 to delete the profile and waits for a confirmation from the source device 10 that the profile has been deleted. This message has to be signed by the eUICC certificate so that it can be verified later on by the SM-DP+ entity 22. Additionally, the ICCID of the profile that has been deleted is required to be included in this message. This is important since the SM-DP+ entity 22 has no other way of knowing whether the actual profile with the ICCID number that was sent previously for deletion has been deleted or not. The delete process involving the MNO/SM-DP+ was described with reference to FIG. 2. In the embodiments described with reference to FIG. 4 only the certified deletion confirmation message process is used.

After obtaining this deletion confirmation, the SM-DP+ entity 22 is ready to make an update of the profile and optionally modifying parts of the subscription information. The SM-DP+ entity 22 is now able to prepare the updated profile and make it available for download to the destination device 30. After updating the profile, the SM-DP+ 22 also generates an Activation Code (AC) that can be used by the destination device 30 for downloading the profile. Although the activation code may be given to the user by a MNO, in this case the SM-DP+ entity 22 may actually create the activation code by itself and provide it to the user. This owing to the fact that all the necessary information that is needed in an activation code can be generated by the SM-DP+ entity 22. For example, the SM-DP+ address needed in the activation code can be provided by the SM-DP+ entity 22 as its own address and for the AC-Token (MatchingID i.e. an ID that indicates the profile to be downloaded), a MatchingID can be generated by the SM-DP+ entity 22 as it is the SM-DP+ entity 22 which creates this profile. Since a confirmation code is optional, it can be omitted for the profile migration scenario as it might slow down the migration process. Although the confirmation code may be generated by the SM-DP+ entity 22, it is the distribution of this code that may slow down the whole process. If confirmation code is used, then MNO preferably sends it to the user by using a different channel (i.e. not the same channel that is used to send the activation code) and this is not standardized.

FIG. 4 is a signaling diagram illustrating various embodiments of the present teachings, without mobile network operator involvement. In particular, the above briefly described process is illustrated and described more in detail with reference to FIG. 4. These embodiments involve the source device 10 comprising or having access to the migration application 23, the migration service 21a provided by the SM-DP+ entity 22 and the destination device 30 (LPA 31 thereof). A step by step description is provided in the following:

At arrow 201, the user launches the migration application 23 in the source device 10 from where he/she can migrate the current subscription. Again, as noted before, it may also be possible to launch the migration operation using a primary device if the companion device does not have any user interface. This migration application 23 first finds the address of the serving SM-DP+ entity 22 (i.e. the SM-DP+ that holds the information of this profile) and establishes a TLS connection with the associated SM-DP+ migration service 21b for further secure communication. The address of this serving SM-DP+ entity 22 can be achieved in many ways and reference is made to description of arrow 101 in relation to FIG. 2 for examples.

At arrow 202, the migration service 21b of the SM-DP+ entity 22 now asks for the eUICC Information Set (EIS) and the ICCID of the profile that will be migrated from the migration application 23. The EIS includes the certificate of the eUICC 14 of the source device 10. The certificate also includes the EID of the eUICC 14. Using this certificate the migration service 21b verifies the EID of the eUICC 14 and learns about the ICCID of the profile to be migrated.

At arrow 203, the migration application 23 queries the LPA 11 e.g. via the LUI 13 for this EIS and ICCID.

At arrow 204, the LPA 11 provides this information (e.g. via the LUI 13) to the migration application 23.

At arrow 205, the migration application 23 forwards this EIS and ICCID to the SM-DP+ entity 22.

At arrow 206, the SM-DP+ entity 22 queries its internal database (or database accessible by the SM-DP+ entity 22) to find related information for this EID and ICCID, using the information sent by the eUICC 14. The SM-DP+ entity 22 can at this point verify whether it will allow this profile to be migrated into a new device (the destination device 30) or not based on the policy associated with this profile. As noted earlier, it may not always be allowed to migrate a subscription. The EID and/or IMEI of the destination device 30 may be communicated to the SM-DP+ entity 22. This enables the SM-DP+ entity 22 to check both if the profile is allowed to be migrated and also if the destination device 30 is acceptable as destination device for the profile (e.g. has required capabilities).

At arrow 207, the SM-DP+ entity 22 asks the migration application 23 to delete the eUICC profile with this ICCID.

At arrow 208, the migration application 23 now starts a Delete profile functionality of the LPA 11. The delete operation is completed as specified in the GSMA specification with the exception that, according to these embodiments, the eUICC 14 has to send the signed confirmation of the deletion message that includes the ICCID number of the deleted profile.

At arrow 209, the signed confirmation of this delete operation is sent back to the migration application 23 from the LPA 11 of the source device 10 (e.g. via the LUI 13).

At arrow 210, the migration application 23 forwards this signed confirmation to the SM-DP+ 22.

At arrow 211, the SM-DP+ 22 verifies the signature of this confirmation using the certificate sent previously in step 205. It also verifies the ICCID presented in this message with the ICCID that was requested to be migrated in step 205. This signature verification works owing to the fact that the certificate sent in step 205 has this root of trust from the Certificate Issuer (CI) which the SM-DP+ 22 trusts.

At arrow 212, after confirming that the current profile for this subscription is deleted, the SM-DP+ 22 asks for the EID of the new device's eUICC 34 from the migration application 23.

At arrow 213, the migration application 23 asks the user to input the EID of the destination device's 30 eUICC 34 to which the subscription will be migrated. The user can input it manually or having the source device 10 querying the information from the destination device 30 or the destination device 30 may produce the EID in some form of machine readable format (e.g. QR code) and the source device 10 can read it by itself (e.g. using QR-scanner).

At arrow 214, the migration application 23 forwards this EID to the SM-DP+ 22.

At arrow 215, the SM-DP+ 22 now starts updating and creating this bounded profile package for this specific eUICC and selected profile. The SM-DP+ 22 makes sure that selected subscription information remains the same for the new profile. For instance, the MSISDN and IMSI could remain the same for the updated profile, while the subscription key could be changed. If any of the subscription information gets updated then the MNO also need to be notified and need to update some information in its internal database.

At arrow 216, the SM-DP+ 22 generates an Activation Code (AC) in accordance with the earlier mentioned GSMA specification. This AC is required in the profile download phase in the destination device 30.

At arrow 217, the AC is sent to the migration application 23. It can be sent in text for manual input or it can be sent in some machine readable format.

At arrow 218, the AC is transferred from the migration application 23 to the destination device 30. It can be a manual input by the user in the destination device 30 or it can be a machine read e.g. QR code scanning, or it can be transferred from the migration application 23 to the destination device 30 using wireless/wired connectivity.

At arrow 219, the user of the destination device initiates the profile download process in the destination device 30 and is prompted for the AC.

At arrow 220, the destination device's 30 eUICC 34 continues with the profile download as per the GSMA specification.

The embodiments described earlier, e.g. in relation to FIG. 2, wherein the EID is not provided when requested by the migration service 21b, may be implemented also for the architecture described in FIGS. 3 and 4. When the migration service 21b prompts (at arrow 212) for the EID of the eUICC 34 of the destination device an empty string or other input indicating the EID to be unidentified (unknown) is instead entered/sent (arrow 214). The EID is then provided at a later stage, e.g. in relation to actions described with reference to arrow 219. The description provided in relation to FIG. 2 regarding this is applicable also here and reference is therefore made thereto.

The steps that have been described may be performed in another order than illustrated and described with reference to FIG. 4. For instance, the steps described with reference to step 212, 213 and step 214 can be performed after step 201, together with or after step 206 as these three steps 212, 213, 214 are informational steps and the only requirement is that the use of this information (updating the profile to a new device) should be completed after the old profile has been deleted. After successful downloading of the profile in the destination device's 30 eUICC 34 and activating this profile, the user gets to use the same subscription for the destination device 30.

There are several options possible for an SM-DP+ entity 22 while preparing an update of a profile in step 215. The SM-DP+ entity 22 might reuse the old IMSI and the old keys associated with it or can use the old IMSI and generate new keys based on SM-DP+/MNO policy for this profile migration process. The profile generation process between MNO and the SM-DP+ entity 22 is non-standardized and it is mentioned in the GSMA specification that the MNO as well as the SM-DP+ can generate the keys for a subscription. If for the migration case the SM-DP+ entity 22 generates new keys, then it has to communicate about this change to the respective MNO. Then the MNO has to update its internal database so that the migrated profile with new keys is still being authenticated in the network. If the SM-DP+/MNO choses to use the same keys, then there is no involvement needed from the MNO. The migration process will be transparent for the MNO which is advantageous for the MNO from the perspective that MNO maintenance work is reduced greatly for keeping the same subscription. Keeping the same subscription is equivalent to, for the case of physical SIM cards, moving the SIM card from one device to another.

For the subscription migration process using only SM-DP+ mechanism to work, the migration application 21b has to know the serving SM-DP+ 22 address. This is the SM-DP+ 22 that stores the profile information and it may be the SM-DP+ 22 that actually created the profile in the first place. There can be many different ways to find this serving SM-DP+ 22, as has been noted earlier. Next a few exemplary solutions are provided:

1. The profile itself may store the address to the serving SM-DP+ migration service 21b when being provided through a migration portal (e.g. web site, as described earlier e.g. with reference to FIG. 1). The migration application 23 is able to query the eUICC profile using the LPA and able to get the SM-DP+ address. In this case, if the serving SM-DP+ entity 22 address changes due to the MNO is moving to a new SM-DP+, then the serving SM-DP+ address in the profile can be updated using the over the air (OTA) channel by the MNO.

2. The serving SM-DP+ entity 22 address can be stored in the metadata that is stored for each profile. Usually the profile metadata includes the ICCID, Profile name, Operator/Service provider name, profile nickname, icon, etc. This metadata is supplied by the SM-DP+ to the eUICC during the profile download phase. ISD-R is the entity that stores this information. Now, the metadata format can be extended to store the serving SM-DP+ address also in the eUICC. This requires a change in the StoreMetadata function command (section 5.2.2.3 in SGP.22) format on the ES8+ interface. Now, if this information can be saved with the metadata of a profile, then the migration application 23 can query the eUICC using LPA services to get the address of the serving SM-DP+.

Next some security considerations are noted, which are valid irrespective of where the migration service 21a, 21b is implemented. In step at arrows 115, 215 it is mentioned that the migration service 21a of the MNO and migration service 21b in SM-DP+ entity 22, respectively can reuse the same IMSI and associated keys or create new keys for the same IMSI for the new profile. Reusing the same keys entail some risks which are discussed in the following. In view of this, it is suggested that, in some embodiments, the migration service 21a of the MNO and migration service 21b in SM-DP+ entity 22, respectively uses the same IMSI (since it is the same subscription) but that new keys associated with that IMSI is generated by the migration service 21a or by the SM-DP+ 19. This becomes relevant if, for instance, considering the following two scenarios:

In a first scenario the source device 10 may be able to send the authenticated deletion confirmation of the profile to the migration service 21a of the MNO and migration service 21b in SM-DP+ entity 22, respectively even if the source device 10 has malfunctioned during deletion of a profile and the profile therefore still exists in the eUICC.

In a second scenario an attacker is able to replicate the first scenario. If the profile is not deleted then the user can reactivate it later.

In both scenarios there will then exist two different eUICCs profiles with same valid IMSI. However, if the migration service 21a of the MNO and migration service 21b in SM-DP+ entity 22, respectively regenerates new keys for the profile every time it is migrated, then the old device (i.e. source device) will not be able to connect to the network as it will not have the correct keys. This also protects from a possible attack scenario where the user manages to download (if there is no protection function against it) the old profile in the old device using the old activation code. However, the old device will still not be able to connect to the network as it will not have the correct keys to connect to the network.

The above embodiments provide a number of advantages. For instance, the method provides a greater flexibility and convenience for users in terms of migrating their subscription into a new device. The method adds a new feature about what can be done using remote SIM provisioning, which is currently missing from the GSMA specification. This is even more beneficial for devices with a very small form factor. Consider, for instance, a use case where the user wants to migrate his/her current subscription into his smart watch (which comprises an eUICC) just for the (relatively short) time he/she goes for a run, as he/she does not want to carry the phone during that time. Now, of course he/she can order a new subscription for this device using the GSMA defined process, but it is more useful and convenient if the user can just migrate the current subscription to this device for the amount of time he/she needs. Now the user can be reached at the destination device using the same MSISDN, and e.g. receive SMS, call notifications etc.

Figure 5:
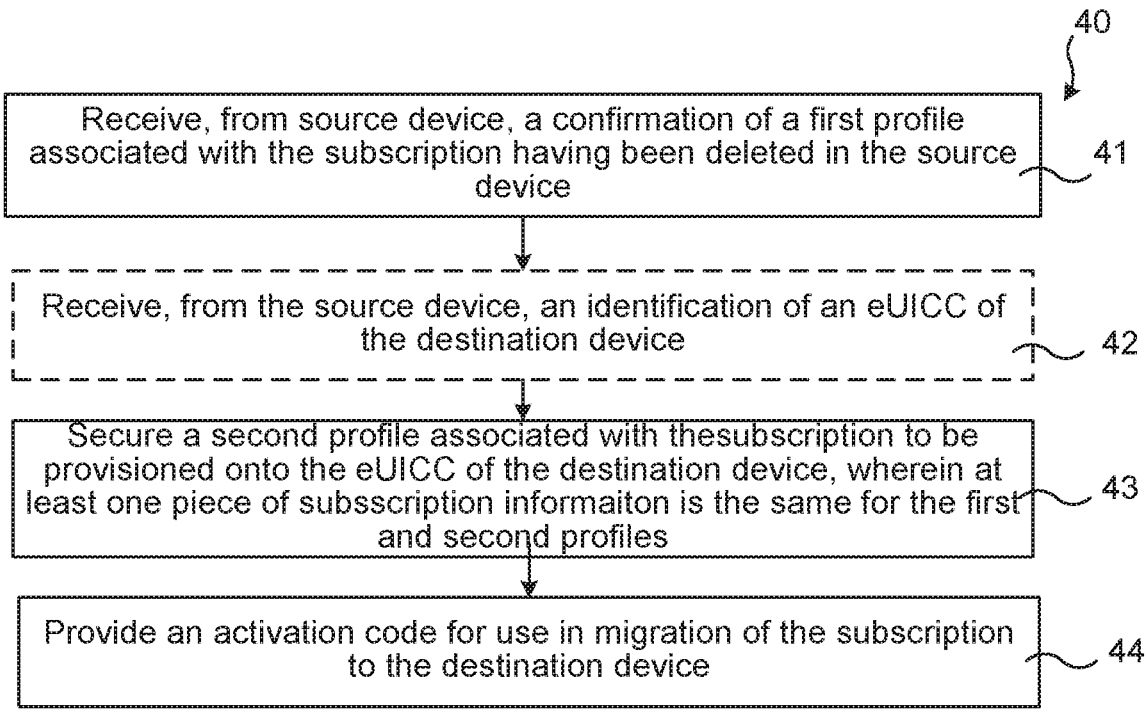
FIG. 5 illustrates a flow chart over steps of an embodiment of a method in a migration entity in accordance with the present teachings.

FIG. 5 illustrates a flow chart over steps of an embodiment of a method in a migration entity in accordance with the present teachings.

The method 40 enabling migration of a subscription from a source device 10 to a destination device 30 may be performed in a migration entity 20, 22, such as in, for instance, the described network entity 20 (provided by a mobile network operator) or the SM-DP+ entity 22.

The method 40 comprises receiving 41, from the source device 10, a confirmation of a first profile associated with the subscription having been deleted in the source device 10.

The method 40 comprises securing 43 a second profile associated with the subscription to be provisioned onto the eUICC 34 of the destination device 30, wherein at least one piece of subscription information is the same for the first and second profiles.

The method 40 comprises providing 44 an activation code for use in migration of the subscription to the destination device 30. The activation code may, for instance, be used for downloading the subscription to the destination device, hence finalizing the migration.

As has been described earlier, the activation code may be provided in different ways. The activation code may, for instance, be provided to the source device 10 for displaying it on e.g. a software application ("app"). A user may then input the activation code for finalizing the migration (the activation code may then, for instance, be transferred to the destination device 30). As another example, the migration entity 20, 22 may display the activation code for the given identification of the eUICC 34 and the user can read it or scan it into the destination device. As still another example, the migration entity 20, 22 may store the activation code together with the EID of the destination device. When the destination device connects to the migration entity 20, 22 and provides its EID, the migration entity 20, 22 may then provide the activation code in return.

In an embodiment, the method 40 comprises, prior to the securing 43, receiving 42, from the source device 10, an identification, EID, of an embedded universal integrated circuit card, eUICC, 34 of the destination device 30. This step 42 is optional, as indicated also by box 42 being drawn with dashed lines. When the EID is provided it may in turn be provided to the SM-DP+ entity.

In embodiments, wherein this EID is not provided before the providing 44 of the activation code, the EID may instead be provided later when using the activation code for downloading the profile, as has been described earlier. When the EID is provided it may in turn be provided (by the destination device 30) to the SM-DP+ entity.

In some embodiments, wherein the migration entity 20 comprises a network entity, the step of securing 43 a second profile for the destination device 30 comprises sending, to a Subscription Manager Data Preparation, SM-DP+, entity 19, a request for updating the first profile related to the subscription and receiving in response a confirmation of a second profile having been created.

The second profile may be secured in different ways. For instance, the second profile may be secured by sending a request to the SM-DP+ entity 19 for updating the first profile and receive in response confirmation of second profile having been created. The updating as such is not performed in the migration entity, but in the SM-DP+ entity 19. Further, when the migration entity 20 comprises an MNO operated network entity, the network entity can change some of the subscription information and then request the SM-DP+ to create an updated profile with this updated information. The SM-DP+ may then create a profile (in some embodiments a bounded profile) with the updated information. It is noted that for the embodiments wherein the profile creation/updating is performed in the SM-DP+, the SM-DP+ provides the modified information to the MNO.

In a variation of the above embodiment, the request for updating comprises identification of the first profile and indication on any parameter changes.

In some embodiments, the migration entity 22 comprises a Subscription Manager Data Preparation, SM-PD+, entity and the step of securing 43 a second profile for the destination device 30 comprises creating a profile package (e.g. bound profile package) with at least some profile data being the same as for the first profile of the source device 10.

In various embodiments, the first and second profiles have as common subscription information one of an International mobile subscriber identity, IMSI, and Mobile Station International Subscriber Directory Number, MSISDN, and wherein an authentication key associated in the destination device 30 with the IMSI is different than a corresponding authentication key associated in the source device 10 with the IMSI.

It is noted that Mobile Station International Subscriber Directory Number, MSISDN, may be used as an alternative to or in addition to using IMSI, since the MSISDN is logically bound with the IMSI.

Figure 6:
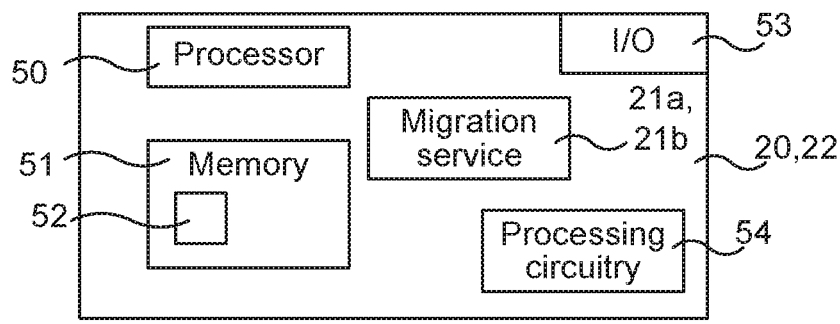
FIG. 6 illustrates schematically a migration entity and means for implementing embodiments of the method in accordance with the present teachings.

FIG. 6 illustrates schematically a migration entity and means for implementing embodiments of the method in accordance with the present teachings.

The migration entity 20, 22 comprises a processor 50 comprising any combination of one or more of a central processing unit (CPU), multiprocessor, microcontroller, digital signal processor (DSP), application specific integrated circuit etc. capable of executing software instructions stored in a memory 51 which can thus be a computer program product. The processor 50 can be configured to execute any of the various embodiments of the method 40 for instance as described in relation to FIG. 5.

The memory 51 of the migration entity 20, 22 can be any combination of read and write memory (RAM) and read only memory (ROM), Flash memory, magnetic tape, Compact Disc (CD)-ROM, digital versatile disc (DVD), Blu-ray disc etc. The memory 51 may also comprise persistent storage, which, for example, can be any single one or combination of magnetic memory, optical memory, solid state memory or even remotely mounted memory.

The migration entity 20, 22 may comprise an interface 53 for communication with other devices and/or entities. The interface 53 may, for instance, comprise a protocol stack, for communication with other devices or entities. The interface may be used for receiving data input and for outputting data.

The migration entity 20, 22 may comprise additional processing circuitry, schematically indicated at reference numerals 54 for implementing the various embodiments according to the present teachings.

The migration entity 20, 22 also comprises the migration service 21*a*, 21*b* as has been described, provided e.g. by means of a management portal.

A migration entity 20, 22 is provided for enabling migration of a subscription from a source device 10 to a destination device 30. The migration entity 20, 22 is configured to:

receive, from the source device 10, a confirmation of a first profile associated with the subscription having been deleted in the source device 10, secure a second profile associated with the subscription to be provisioned onto the eUICC 34 of the destination device 30, wherein at least one piece of subscription information is the same for the first and second profiles, and provide an activation code for use in migration of the subscription to the destination device 30.

The migration entity 20, 22 may be configured to perform the above steps e.g. by comprising one or more processors 50 and memory 51, the memory 51 containing instructions executable by the processor 50, whereby the migration entity 20, 22 is operative to perform the steps.

In an embodiment thus, a migration entity is provided for migrating a subscription from a source device to a destination device. The migration entity 20, 22 comprises one or more processors 50 and memory 51, the memory 51 containing instructions executable by the processor 50, whereby the migration entity 20, 22 is operative to: receive, from the source device, a confirmation of a first profile associated with the subscription having been deleted in the source device, secure a second profile associated with the subscription to be provisioned onto the eUICC of the destination device, wherein at least one piece of subscription information is the same for the first and second profiles, and provide an activation code for use in migration of the subscription to the destination device.

In an embodiment, the migration entity 20 is configured to, prior to the securing the second profile, receive, from the source device 10, an identification, EID, of an embedded universal integrated circuit card, eUICC, 34 of the destination device 30.

In an embodiment, the migration entity 20 comprises a network entity and is configured to secure a second profile for the destination device 30 by sending, to a Subscription Manager Data Preparation, SM-DP+, entity 19, a request for updating the first profile related to the subscription and receiving in response a confirmation of a second profile having been created.

In a variation of the above embodiment, the request for updating comprises identification of the first profile and indication on any parameter changes.

In some embodiments, the migration entity 22 comprises a Subscription Manager Data Preparation, SM-DP+, entity and is configured to secure a second profile for the destination device 30 by creating a profile package with at least some profile data being the same as for the first profile of the source device 10.

In some embodiments, the first and second profiles have as common subscription information one of an International mobile subscriber identity, IMSI, and Mobile Station International Subscriber Directory Number, MSISDN, and wherein an authentication key associated in the destination device 30 with the IMSI is different than a corresponding authentication key associated in the source device 10 with the IMSI.

The present teachings also encompass a computer program 52 for a migration entity 22 for migrating a subscription. The computer program 52 comprises computer program code, which, when executed on at least one processor on the migration entity 22, causes the migration entity 22 to perform the method 40 according to any of the described embodiments.

The present teachings also encompass computer program products 51 for a migration entity 22 for migrating a subscription from a source device 10 to a destination device 30. The computer program product 51 comprises the computer program 52 for implementing the embodiments of the methods as described, and a computer readable means on which the computer program 52 is stored. The computer program product, or the memory, thus comprises instructions executable by the processor 50.

Such instructions may be comprised in a computer program, or in one or more software modules or function modules. The computer program product 51 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 7:
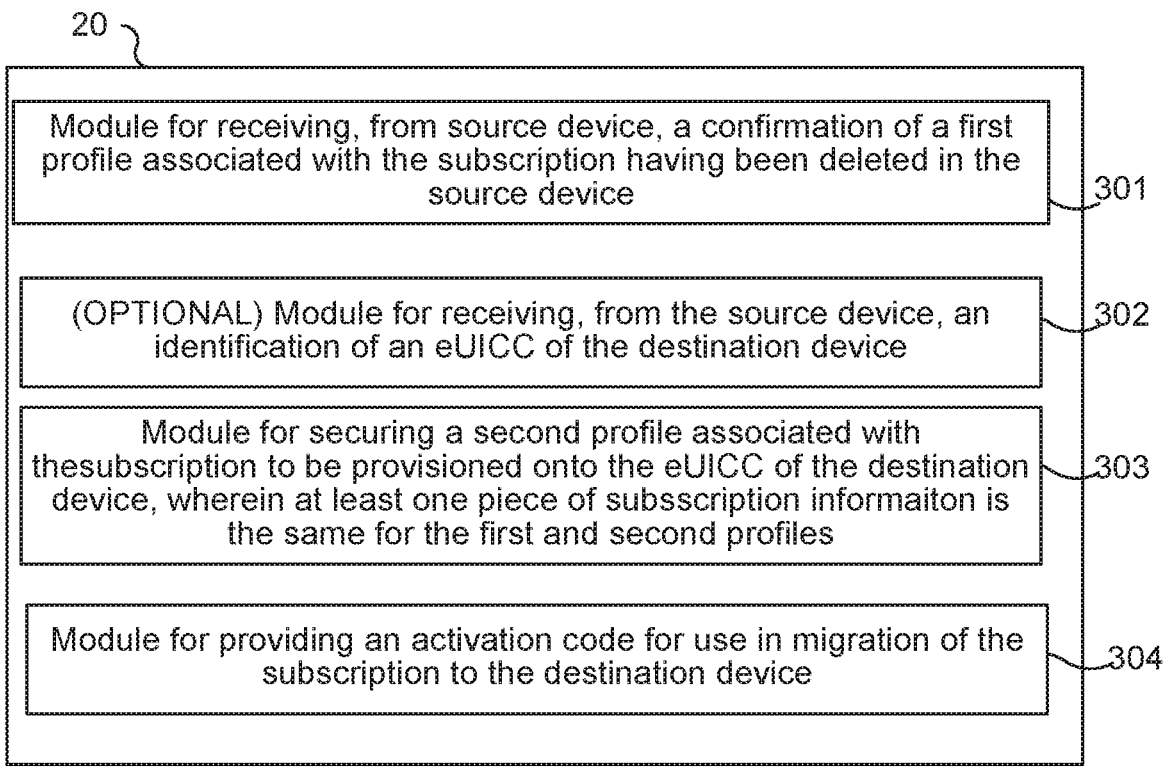
FIG. 7 illustrates a migration entity comprising function modules/software modules for implementing embodiments of the present teachings.

FIG. 7 illustrates a migration entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 30 that has been described in various embodiments.

A migration entity is provided for migrating a subscription from a source device to a destination device. The migration entity comprises a first module 301 for receiving, from the source device, a confirmation of a first profile associated with the subscription having been deleted in the source device. Such first module 301 may, for instance, comprise receiving circuitry or an input device.

The migration entity may, in some embodiments, comprise a second module 302 for receiving, from the source device, an identification, EID, of an embedded universal integrated circuit card, eUICC, of the destination device. Such second module 302 may, for instance, comprise receiving circuitry or an input device.

The migration entity comprises a third module 303 for securing a second profile associated with the subscription to be provisioned onto the eUICC of the destination device, wherein at least one piece of subscription information is the same for the first and second profiles. Such third module 303 may, for instance, comprise processing circuitry adapted to secure data such as the second profile, e.g. by a request-operation.

The migration entity comprises a fourth module 304 for providing an activation code for use in migration of the subscription to the destination device. Such fourth module 304 may, for instance, comprise processing circuitry adapted for such providing, or an output device or transmission circuitry.

It is noted that one or more of the modules 301, 302, 303, 304 may be replaced by units.

Figure 8:
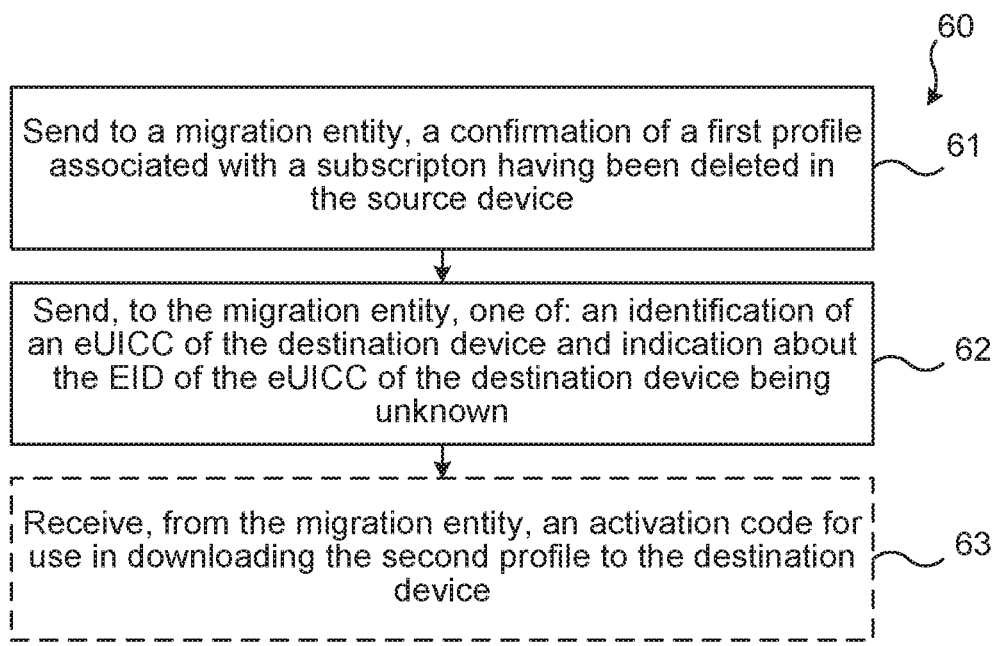
FIG. 8 illustrates a flow chart over steps of an embodiment of a method in a source device in accordance with the present teachings.

FIG. 8 illustrates a flow chart over steps of an embodiment of a method in a source device in accordance with the present teachings.

A method 60 enabling migration of a subscription to a destination device 30 is provided. The method 60 may be performed in a source device 10 and comprises:

sending 61, to a migration entity 20, 22, a confirmation of a first profile associated with the subscription having been deleted in the source device 10, and sending 62, to the migration entity 20, 22, one of: an identification, EID, of an embedded universal integrated circuit card, eUICC, 34 of the destination device 30 and indication about the EID of the eUICC 34 of the destination device 30 being unknown.

In an embodiment, the method 60 comprises receiving 63, from the migration entity 20, 22 an activation code for use in downloading the second profile to the destination device 30. This is an optional step, which is indicated by box at step 63 being drawn with dashed lines. When the source device 10 receives the activation code, it may subsequently be provided to the destination device 30 in different ways.

The method 60 provides several advantages. For instance, the method 60 offers a user a convenient way of migrating a subscription (i.e. profile) between his or her devices. The method 60 enables a valuable service for the users, since it automates the migration to a great extent. The migration could e.g. be reduced to simply pushing a button, which is very user friendly. A further advantage is that the method 60 enables cost savings for the user since he/she does not have to have multiple subscriptions: one subscription is simply migrated between his/her devices. Still another advantage is that the method 60 enables the user to be reachable with different devices using the same subscription.

In an embodiment, the sending 61, to a migration entity 20, 22, the confirmation of a first profile associated with the subscription having been deleted in the source device 10, comprises signing the confirmation by a certificate for the eUICC 34 and including in the confirmation an identity identifying the first profile.

The identity for identifying the first profile may, conveniently, comprise the Integrated Circuit Card ID (ICCID) or IMSI, which is commonly used to identify the profile provisioned onto (or present on) an eUICC.

In some embodiments, the method 60 comprises, prior to the step of sending 61 a confirmation of the first profile being deleted, setting up a secure session (e.g. a transport layer security, TLS, session) with the migration entity 20, 22, and using secure session keys (e.g. TLS session keys) in further communication with the migration entity 20, 22.

In some embodiments, the method 60 comprises sending the activation code to the destination device 30.

Figure 9:
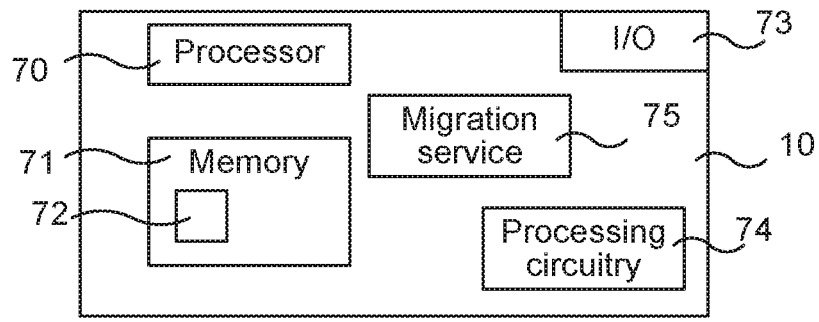
FIG. 9 illustrates schematically a source device and means for implementing embodiments of the method in accordance with the present teachings.

FIG. 9 illustrates schematically a source device and means for implementing embodiments of the method in accordance with the present teachings.

The source device 10 comprises a processor 70 comprising any combination of one or more of a central processing unit (CPU), multiprocessor, microcontroller, digital signal processor (DSP), application specific integrated circuit etc. capable of executing software instructions stored in a memory 71 which can thus be a computer program product. The processor 70 can be configured to execute any of the various embodiments of the method 60 for instance as described in relation to FIG. 8.

The memory 71 of the source device 10 can be any combination of read and write memory (RAM) and read only memory (ROM), Flash memory, magnetic tape, Compact Disc (CD)-ROM, digital versatile disc (DVD), Blu-ray disc etc. The memory 71 may also comprise persistent storage, which, for example, can be any single one or combination of magnetic memory, optical memory, solid state memory or even remotely mounted memory.

The source device 10 may comprise an interface 73 for communication with other devices and/or entities. The interface 73 may, for instance, comprise a protocol stack, for communication with other devices or entities. The interface may be used for receiving data input and for outputting data.

The source device 10 may comprise additional processing circuitry, schematically indicated at reference numerals 54 for implementing the various embodiments according to the present teachings.

The source device 10 may also comprises the migration application 23 as has been described.

A source device 10 enabling migration of a subscription to a destination device 30 is provided. The source device 10 is configured to:

send, to a migration entity 20, 22, a confirmation of a first profile associated with the subscription having been deleted in the source device 10, and send, to the migration entity 20, 22, one of: an identification, EID, of an embedded universal integrated circuit card, eUICC, 34 of the destination device 30 and indication about the EID of the eUICC 34 of the destination device 30 being unknown.

The source device 10 may be configured to perform the above steps e.g. by comprising one or more processors 70 and memory 71, the memory 71 containing instructions executable by the processor 70, whereby the source device 10 is operative to perform the steps.

In an embodiment thus, a source device is provided enabling migration of a subscription to a destination device 30. The source device comprises one or more processors and memory, the memory containing instructions executable by the processor, whereby the source device is operative to: send, to a migration entity, a confirmation of a first profile associated with the subscription having been deleted in the source device, send, to the migration entity, one of: an identification, EID, of an embedded universal integrated circuit card, eUICC, of the destination device and indication about the EID of the eUICC of the destination device being unknown.

In an embodiment, the source device 10 is configured to receive, from the migration entity 20, 22 an activation code for use in downloading the second profile to the destination device 30.

In an embodiment, the source device 10 is configured to send, to a migration entity 20, 22, the confirmation of a first profile associated with the subscription having been deleted in the source device 10, by signing the confirmation by a certificate for the eUICC 34 and including in the confirmation an identity identifying the first profile.

In some embodiments, the source device 10 is configured to, prior to sending a confirmation of the first profile being deleted, set up a secure session with the migration entity 20, 22, and to use session keys in further communication with the migration entity 20, 22.

In some embodiments, the source device 10 is configured to send the activation code to the destination device 30.

The present teachings also encompass a computer program 72 for a source device 10 for migrating a subscription. The computer program 72 comprises computer program code, which, when executed on at least one processor on the source device 10, causes the source device 10 to perform the method 60 according to any of the described embodiments.

The present teachings also encompass computer program products 71 for a source device 10. The computer program product 71 comprises the computer program 72 for implementing the embodiments of the methods as described, and a computer readable means on which the computer program 72 is stored. The computer program product, or the memory, thus comprises instructions executable by the processor 70. Such instructions may be comprised in a computer program, or in one or more software modules or function modules. The computer program product 71 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 10:
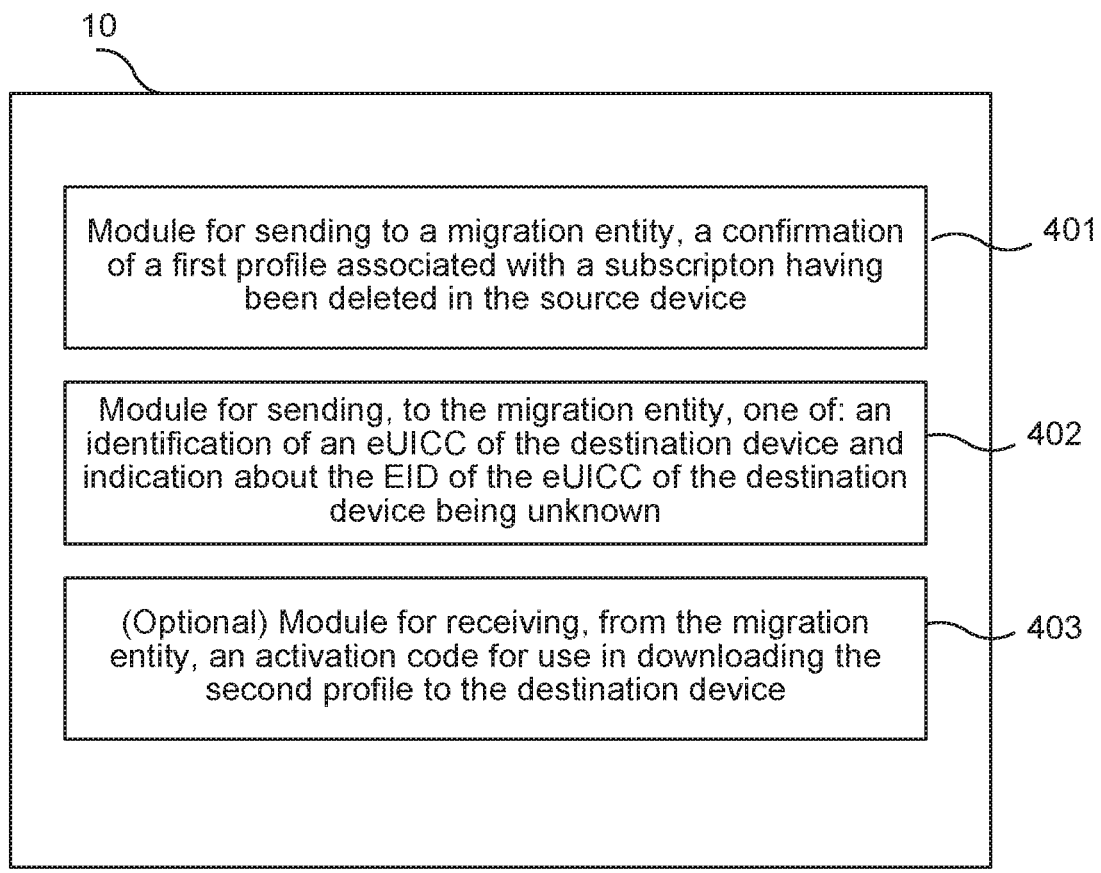
FIG. 10 illustrates a source device comprising function modules/software modules for implementing embodiments of the present teachings.

FIG. 10 illustrates a source device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 60 that has been described in various embodiments.

A source device is provided for migrating a subscription. The source device comprises a first module 401 for sending, to a migration entity, a confirmation of a first profile associated with the subscription having been deleted in the source device. Such first module 401 may, for instance, comprise transmitting circuitry or an output device.

The source device comprises a second module 402 for sending, to the migration entity, one of: an identification, EID, of an embedded universal integrated circuit card, eUICC, of the destination device and indication about the EID of the eUICC of the destination device being unknown. Such second module 402 may, for instance, comprise transmitting circuitry or an output device.

In some embodiments, the source device comprises a third module 403 for receiving, from the migration entity an activation code for use in downloading the second profile to the destination device. Such third module 403 may, for instance, comprise receiving circuitry or an input device.

It is noted that one or more of the modules 401, 402, 403 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method enabling migration of a subscription from a source device to a destination device, the method being performed in a migration entity and comprising:
   receiving, from the source device, a confirmation of a first profile associated with the subscription having been deleted in the source device,
   securing a second profile associated with the subscription to be provisioned onto the eUICC of the destination device, wherein at least one piece of subscription information is the same for the first and second profiles, and
   providing an activation code for use in migration of the subscription to the destination device.

2. The method as claimed in claim 1, comprising, prior to the securing, receiving, from the source device, an identification, EID, of an embedded universal integrated circuit card, eUICC, of the destination device.

3. The method as claimed in claim 1, wherein the migration entity comprises a network entity and the step of securing a second profile for the destination device comprises sending, to a Subscription Manager Data Preparation, SM-DP+, entity, a request for updating the first profile related to the subscription and receiving in response a confirmation of a second profile having been created.

4. The method as claimed in claim 1, wherein the migration entity comprises a Subscription Manager Data Preparation, SM-DP+, entity and the step of securing a second profile for the destination device comprises creating a profile package with at least some profile data being the same as for the first profile of the source device.

5. A computer program product comprising a computer readable media storing a computer program for a migration entity for migration of a subscription, the computer program when executed on at least one processor on the migration entity causes the migration entity to perform the method according to claim 1.

6. A migration entity enabling migration of a subscription from a source device to a destination device, the migration entity being configured to:
receive, from the source device, a confirmation of a first profile associated with the subscription having been deleted in the source device,
secure a second profile associated with the subscription to be provisioned onto the eUICC of the destination device, wherein at least one piece of subscription information is the same for the first and second profiles, and
provide an activation code for use in migration of the subscription to the destination device.

7. The migration entity as claimed in claim 6, configured to, prior to the securing, receive, from the source device, an identification, EID, of an embedded universal integrated circuit card, eUICC, of the destination device.

8. The migration entity as claimed in claim 6, wherein the migration entity comprises a network entity and is configured to secure a second profile for the destination device by sending, to a Subscription Manager Data Preparation, SM-DP+, entity, a request for updating the first profile related to the subscription and receiving in response a confirmation of a second profile having been created.

9. The migration entity as claimed in claim 8, wherein the request for updating comprises identification of the first profile and indication on any parameter changes.

10. The migration entity as claimed in claim 6, wherein the migration entity comprises a Subscription Manager Data Preparation, SM-DP+, entity and is configured to secure a second profile for the destination device by creating a profile package with at least some profile data being the same as for the first profile of the source device.

11. The migration entity as claimed in claim 6, wherein the first and second profiles have as common subscription information one of an International mobile subscriber identity, IMSI, and Mobile Station International Subscriber Directory Number, MSISDN, and wherein an authentication key associated in the destination device with the IMSI is different than a corresponding authentication key associated in the source device with the IMSI.

12. A method enabling migration of a subscription to a destination device, the method being performed in a source device and comprising:
sending, to a migration entity, a confirmation of a first profile associated with the subscription having been deleted in the source device, and
sending, to the migration entity, one of: an identification, EID, of an embedded universal integrated circuit card, eUICC, of the destination device and indication about the EID of the eUICC of the destination device being unknown.

13. The method as claimed in claim 12, comprising receiving, from the migration entity an activation code for use in downloading the second profile to the destination device.

14. The method as claimed in claim 12, wherein the sending, to a migration entity, the confirmation of a first profile associated with the subscription having been deleted in the source device, comprises signing the confirmation by a certificate for the eUICC and including in the confirmation an identity identifying the first profile.

15. A computer program product comprising a computer readable medium storing a computer program that when executed by a processor performs the method of claim 12.

16. A source device enabling migration of a subscription to a destination device, the source device being configured to:
send, to a migration entity, a confirmation of a first profile associated with the subscription having been deleted in the source device, and
send, to the migration entity one of: an identification, EID, of an embedded universal integrated circuit card, eUICC, of the destination device and indication about the EID of the eUICC of the destination device being unknown.

17. The source device as claimed in claim 16, configured to receive, from the migration entity an activation code for use in downloading the second profile to the destination device.

18. The source device as claimed in claim 16, configured to send, to a migration entity, the confirmation of a first profile associated with the subscription having been deleted in the source device, by signing the confirmation by a certificate for the eUICC and including in the confirmation an identity identifying the first profile.

19. The source device as claimed in claim 16, configured to, prior to sending a confirmation of the first profile being deleted, set up a secure session with the migration entity, and to use secure session keys in further communication with the migration entity.

20. The source device as claimed in claim 16, configured to send the activation code to the destination device.

* * * * *